Oct. 7, 1952    A. W. OEHLER    2,612,980
MATERIAL-HANDLING MECHANISM
Filed Nov. 17, 1950    2 SHEETS—SHEET 1
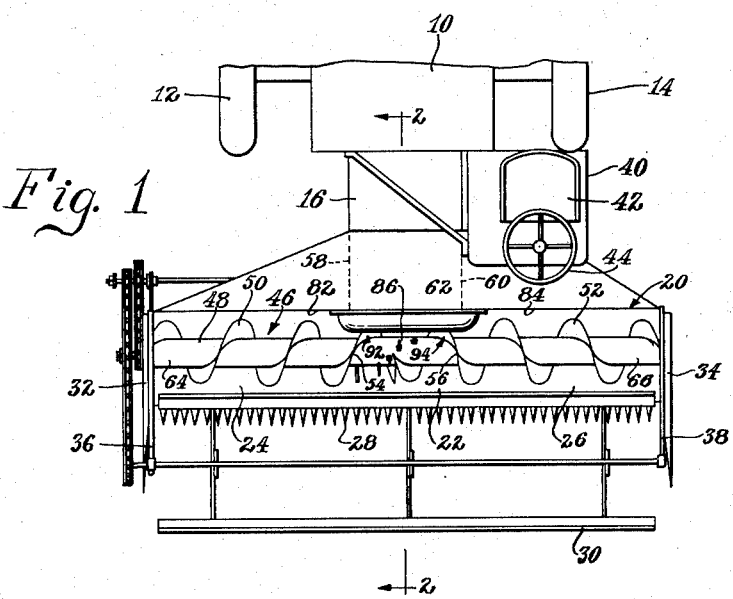
INVENTOR.
A. W. Oehler Oct. 7, 1952 — A. W. OEHLER — 2,612,980
MATERIAL-HANDLING MECHANISM
Filed Nov. 17, 1950 — 2 SHEETS—SHEET 2

INVENTOR.
A. W. Oehler
BY
Attorneys

UNITED STATES PATENT OFFICE 2,612,980

MATERIAL-HANDLING MECHANISM

Alvin W. Oehler, Moline, Ill., assignor to Deere & Company, Moline, Ill., a corporation of Illinois Application November 17, 1950, Serial No. 196,145

9 Claims. (Cl. 198—9)

This invention relates to material-handling mechanism and more particularly to such mechanism as applied to a harvester for handling crops such as grain.

The invention in one aspect is in the nature of an improvement in mechanism of the type disclosed in assignee's United States Patent 2,529,180, wherein is disclosed a harvester of the combine type having a relatively narrow longitudinal body provided at its forward end with a feed opening through which crops are fed rearwardly from a relatively wide harvesting platform in the form of an elongated trough having a pair of rotatable auger means for receiving crops across the front or cutter bar edge of the trough and for moving such crops inwardly toward the center to be ultimately delivered into the feed opening, which leads to material-treating means such as threshing and separating mechanism. The augers are oppositely wound and have inner terminal ends spaced apart axially on the order of the width of the feed opening. In other words, the augers are discontinued immediately ahead of the feed opening and some form of material-handling means, such as blades, paddles or fingers are customarily used to effect rearward transfer of the crops into the feed opening.

A design of this nature, in which the augers terminate as stated above, provides a mechanism that operates satisfactorily in normal operating conditions. However, in abnormal conditions, such as conditions in which the grain is unusually short, it is found that the inward extent of the augers is not sufficient to complete the transfer of crops from the augers to the central material-handling means. According to the present invention, this difficulty is overcome by the provision of attachment means in the form of auger extensions respectively positionable at the inner terminal ends of the augers for selectively varying the axial inward extents of the augers. It is a feature of the invention that each extension auger is provided as a plurality of separable auger or helical vane sections connectible in end-to-end series relationship, these being selectively usable separately or together, whereby the length of the auger conveyor with which they are used may be varied in single or multiple increments according to the arcuate length of each of the attachment sections.

It is an object of the invention to provide the attachment sections as simple and inexpensive auxiliary feeder means and to provide cooperative attachment means whereby the sections may be readily attached to or removed from the main auger conveyor. It is a further object of the invention to utilize auger attachment sections of this character in connection with a main auger conveyor of the type in which one or more helical flights is wound on a tubular core or shaft, and to provide in this shaft access openings having removable covers for facilitating the mounting and dismounting of the attachment sections.

A still further object of the invention resides in the provision of attachment sections that may be used in completely assembled relationship so as to overlap axially in a zone centrally or midway between the ends of the auger, or substantially midway between the laterally spaced apart sides of the feed opening.

The foregoing and other important objects and desirable features inherent in and encompassed by the invention will become apparent as a preferred embodiment thereof is fully disclosed in the following detailed description and accompanying sheets of drawings in which:

Figure 1 is a plan view of the forward portion of what may be considered a combine of conventional construction.

Figure 2 is a longitudinal sectional view taken substantially on the line 2—2 of Figure 1.

Figure 6 is a perspective view of one of the attachment sections.

Figure 3:
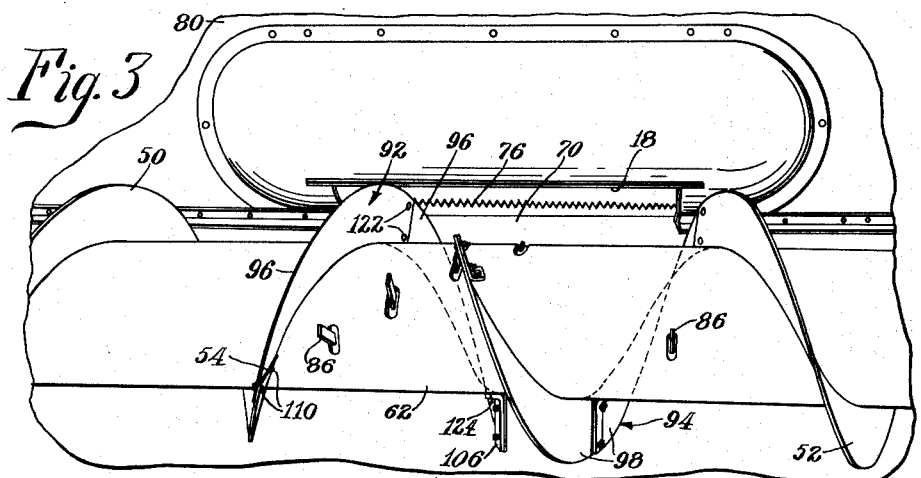
Figures 3, 4 and 5 are perspective views of an intermediate portion of the auger conveyor, illustrating the central part of the auger conveyor and the manner in which the attachment sections are applied thereto.

The combine chosen for the purposes of illustration is of the self-propelled type having a longitudinal body 10 carried on a plurality of wheels, only the forward wheels 12 and 14, which are traction wheels in this case, being shown. A portion of the body 10 extends forwardly in the form of a longitudinal feeder house 16 that is quite narrow compared to the transverse spacing between the wheels 12 and 14. The forward end of the feeder house 16 is open to provide a feed opening 18 through which harvested grain may be fed from a harvester platform designated generally by the numeral 20. The platform is in the form of a substantially elongated trough having an intermediate trough portion 22, directly in front of the feed opening 18 and coextensive therewith, and a pair of extension trough portions 24 and 26 projecting laterally or transversely at opposite sides of the feed opening 18 and thus at opposite sides of the body 10—16. The leading edge of the platform or trough 20 is provided with a conventional cutter bar 28 by means of which standing grain is cut. The rearward delivery of grain over the cutter bar and throughout its entire length is facilitated by a rotating reel 30, as is conventional. The platform 20 is delineated at its opposite ends by end walls 32 and 34 which may include supports 36 and 38 for the reel 30. Other conventional parts of the combine comprise an operator's station 40 including a seat 42 and a steering wheel 44 for guiding the combine.

Figure 5:
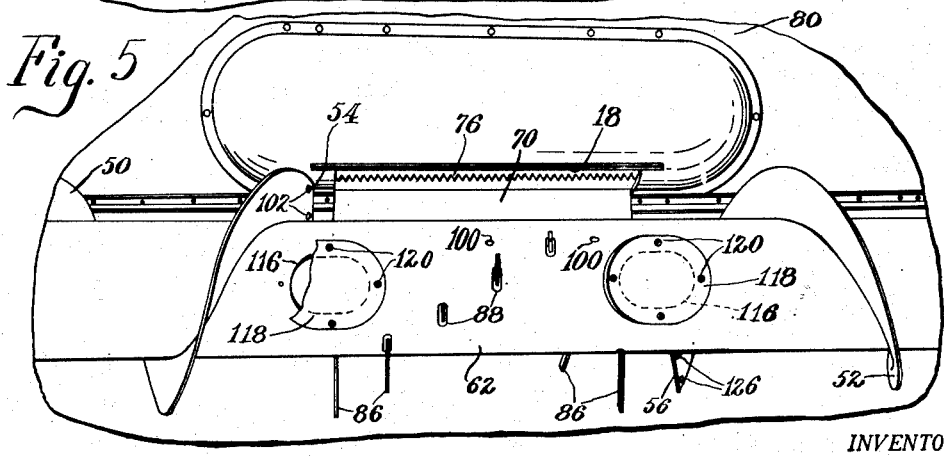

The cut grain delivered rearwardly over the cutter bar 28 by the reel 30 is received by the trough 22—24—26 and is moved centrally or inwardly from the opposite ends of the platform by means of a rotatable auger conveyor designated generally by the numeral 46. This auger includes a central shaft 48 preferably in the form of a tubular core, and a pair of oppositely wound augers or helical vanes 50 and 52 are fixed to the shaft or core 48. The auger or vane 50 extends inwardly from the platform end wall 32 normally to a terminal inner end at 54 (Figure 5). The auger or vane 52 extends centrally or inwardly from the platform end wall 34 to an inner terminal end 56 (also Figure 5). The inner terminal ends 54 and 56 are spaced apart axially on the order of the transverse spacing of side walls 58 and 60 of the feeder house 16. Stated otherwise, the auger shaft or core 48 may be said to comprise three coaxial sections; namely, a central, normally vaneless section 62, and a pair of outer sections 64 and 66 that are respectively substantially coextensive with the trough portions 24 and 26. The central section 62 is substantially coextensive with the central trough portion 22.

A forward portion of the body 10 carries a conventional threshing cylinder 68 to which crops are delivered by an endless conveyor 70 that operates in the direction of the arrow in Figure 2. This conveyor is carried at its end adjacent the cylinder 68 by means of a transverse rotary element 72 and is carried at its forward end by a relatively larger rotary element 74. This element 74 places the forward end of the conveyor 70 just rearwardly of the central section 62 of the auger shaft 46. The conveyor 70 has a plurality of transverse slats 76 by means of which grain is carried upwardly and rearwardly over an inclined floor 78 at the bottom of the feeder house 16. The front of the feeder house is defined by an upright wall portion 80 having its lower edge spaced above the bottom of the trough portion 22 so as to define the feed opening 18. The wall 80 is part of an upright back wall structure including extension portions 82 and 84 extending upwardly respectively from the trough portions 24 and 26.

The auger shaft 46 may carry at its central section 62 means for receiving crops from the augers 50 and 52 and for moving these crops rearwardly through the opening 18 to the conveyor 70. In an instance such as that shown, this means must be capable of handling also harvested crops moving rearwardly directly over the central portion of the cutter bar 28. The particular means shown here follows somewhat the basic principles following the subject matter of assignee's patent identified above and comprises a plurality of crop-engaging elements in the form of fingers 86. These fingers extend inwardly through slots or perforations 88 formed in the tubular section 62 and are journaled at their inner ends on a control shaft 90 fixed in a position parallel to but eccentrically disposed as respects the axis of the auger shaft 46. As the complete auger assembly rotates, the fingers 86 are successively extended and retracted, the sequence of operation of the fingers being such that the fingers are extended outwardly to move forwardly, downwardly and then rearwardly, receiving during this phase of operation crops received directly over the center portion of cutter bar 28 and also crops delivered by the augers 50 and 52, to sweep these crops rearwardly through the feed opening 18. During the succeeding phase, the fingers 86 are retracted to effect stripping of the crops therefrom. The nature of the construction and operation of the feeder can best be seen in Figure 2. The fingers are arranged spirally (Figures 3, 4 and 5) about the central shaft section 62, the pitch of this spiral being substantially longer than the pitch of the auger 50.

The combine is operated under normal conditions with the auger and feeder assembly as shown in Figure 5. With the assembly as thus constituted, long grain is relatively easily handled and wrapping of the grain about the central portion of the auger shaft and clogging of crops at the feed opening will not be experienced. However, in the operation of the combine through short grain, it may be found that the axial inward extent of each auger 50 or 52 is not sufficient to propel the crops far enough inwardly to be handled by the fingers 86. For this purpose, there has been provided according to the present invention auxiliary or attachment means comprising a pair of auger extensions designated generally by the numerals 92 and 94 in Figures 1 and 3. The extension 92 may be used as a continuation or extension of the auger 50. The extension 94 is similarly provided for the auger 52. These extensions respectively have the pitch and direction of the augers with which they are used.

Figure 4:
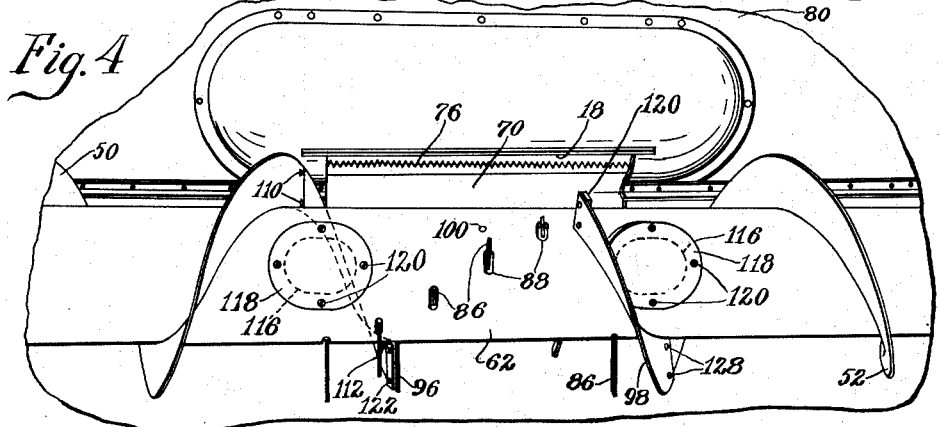

The extension 92 comprises a pair of identical arcuate vane sections 96, connectible in end-to-end series relationship and usable separately or together to vary the axial extent of the auger 50 in single or multiple increments according to the length of a section. In Figure 4, only the single section 96 has been added to the inner terminal end 54 of the auger 50. In Figure 3, both sections 96 have been added. The auger extension 94 comprises a pair of identical arcuate vane sections 98 having the characteristics of the sections 96, with the exception that the spiral thereof is reversed. The sections 96 and 98 may be used in series or combination as suggested in Figures 3 and 4. It will be noted that in Figure 3 the inner sections 96 and 98 extend beyond the midpoint of the feed opening 18 and accordingly overlap axially. The arcuate extent of the sections is such that the overlapping ends thereof are angularly spaced about the central shaft section 62.

It is a feature of the invention to provide attachment means whereby the sections 96 and 98 may be readily mounted on or dismounted from the auger or conveyor assembly. For this purpose, the central section 62 is provided with a plurality of apertures 100, which are spaced apart spirally according to the lengths of the sections 96 and 98. The inner terminal end 54 of the auger 50 has a pair of apertures 102. The section 96 is provided at one end with a pair of apertures 104 (Figure 6) and at its other end with a bracket 106 having an apertured base 108. The section 96 is attached at the inner terminal end 54 of the auger 50 by placing the section on the central shaft section 62 in such manner that the apertures 104 are alined with the apertures 102 and the apertured base 108 of the bracket 106 is alined with the aperture 100 nearest to the terminal end 54 of the auger 50. Bolts 110 (Figures 3 and 4) are passed through the alined apertures 102 and 104 and a third bolt 112 is passed through the apertured base 108 and its alined aperture 100. The central section 62 is provided with a pair of access openings 116, each of which is normally closed or covered by a cover plate 118. The cover plates are removably secured in place by a plurality of cap screws 120. Access may be had through the left hand opening (as viewed in Figures 4 and 5) for assembling the section 96 by means of the bolt 112. After assembly is completed the cover plate 118 is replaced.

The bracket 106 may be secured to the section 96 by a pair of removable bolts 122. When a second section is to be added to the first section as in Figure 3, the end of the second section having the apertures 104 may be connected by means of the bolts 122 to the first section and the bracket 106 on the second section may be connected by another bolt 124 to the next aperture 100 in the central shaft section 62. Again, access may be had through the left hand opening 116.

As previously stated, the sections 98, with the exception of being reversed as respects the sections 96, have all the characteristics of the sections 96 and to that end are provided with attachment means such as those just described. The inner terminal end 56 of the auger 52 has a pair of apertures 126 to which the first attachment section 98 may be secured by a pair of bolts 128. Each section 98 has at its other end a mounting bracket 130 which may be bolted to the central section 62 by means of the appropriate apertures 100.

As is best shown in Figure 3, the innermost sections 96 and 98 not only overlap axially as respects each other but intersect the spiral on which the fingers 86 are arranged. The design is such that all of the sections 96 and 98 pass between the fingers 86 so that operation of the fingers is not in any way impaired.

It will be seen that the operation of the combine is materially improved by the simple expedient of the readily mountable and dismountable sections. The normal design of the combine is not disturbed, it being necessary only to provide the appropriate apertures for mounting the attachment sections. In the particular instance illustrated, the access openings 116 and cover plates 118 therefore are normally provided for facilitating inspection and repairing of the feeder means including the fingers 86.

Various other features of the invention not specifically enumerated herein will undoubtedly occur to those versed in the art, as likewise will many variations of the preferred embodiment of the invention illustrated, all of which may be achieved without departing from the spirit and scope of the invention as defined in the appended claims.

I claim:

1. Material-handling mechanism for a harvester having a longitudinal body including a forward, relatively narrow feed opening and having a forward elongated conveyor trough arranged with its length transverse to the body and ahead of the feed opening to provide a trough portion immediately ahead of and substantially coextensive with the feed opening and a pair of extension trough portions projecting transversely at opposite sides of the body and feed opening, comprising: an elongated conveyor shaft rotatably carried by the trough and substantially coextensive therewith; a pair of main helical vanes oppositely wound on and fixed to the shaft for conveying material in opposite axial directions and along the trough from opposite ends thereof to the feed opening, said vanes having inner terminal ends spaced coaxially apart on the order of the width of the feed opening; means connected to and rotatable with the intermediate shaft portion between said inner terminal ends of the vanes for intercepting axially moving material conveyed by the main vanes and including radially projecting, material-engaging elements for moving such material rearwardly into the feed opening; and a plurality of helical vane extensions selectively mountable on or dismountable from said intermediate shaft portion and providing respectively continuations of the vanes at their inner terminal ends for selectively increasing or decreasing the axial lengths of the main helical vanes, said extensions when mounted intersecting the material-engaging elements to decrease the material-engaging capacity of said elements.

2. The invention defined in claim 1, further characterized in that: the material-engaging elements on the intermediate shaft portion between the inner terminal ends of the vanes comprises a plurality of finger-like members; and the vane extensions are constructed and arranged to spiral between certain of said members.

3. The invention defined in claim 1, further characterized in that: the inner terminal end portion of each vane has first attachment means thereon; the intermediate shaft portion has second attachment means thereon spaced axially and circumferentially of the shaft from the first attachment means; and the vane extensions respectively have axially and circumferentially spaced attachment means cooperative respectively with the aforesaid first and second attachment means to effect the mounting and dismounting of the vane extensions.

4. The invention defined in claim 1, further characterized in that: the vane extensions from the vanes extend axially past the center of the intermediate shaft portion and further extend circumferentially so as to be spaced apart angularly and to overlap axially.

5. The invention defined in claim 1, further characterized in that: the material-moving elements on the intermediate shaft portion between the inner terminal ends of the vanes comprise a plurality of finger-like members arranged spirally about said intermediate shaft portion in the same direction as but of longer pitch than one of the vanes; and the vane extensions spiral between certain of said elements and intersect the spiral of said elements.

6. The invention defined in claim 1, further characterized in that: the intermediate portion of the conveyor shaft is of relatively large tubular construction and has openings therein for access to the interior thereof; removable covers are provided for said openings; said intermediate shaft portion has apertures therein; and the vane extensions have securing means thereon cooperative with said apertures to pass therethrough into the interior of said intermediate shaft section and accessible through said openings when the covers are removed.

7. The invention defined in claim 1, further characterized in that: each extension vane comprises a plurality of separable arcuate sections connectible in end-to-end series relationship and selectively usable together or separately to vary the length of the proximate main vane in single or multiple increments according to the lengths of said sections.

8. Material-handling mechanism for a harvester having a longitudinal body including a forward, relatively narrow feed opening and having a forward, elongated conveyor trough arranged with its length transverse to the body and ahead of the feed opening to provide a trough portion immediately ahead of and substantially coextensive with the feed opening and a pair of extension trough portions projecting transversely at opposite sides of the body and feed opening, comprising: a pair of coaxial oppositely wound auger conveyors rotatably carried by the trough, one over and substantially coextensive with each trough extension portion, for moving material along the trough from its opposite ends toward the feed opening, said conveyors terminating at their inner ends in axially spaced apart relation on the order of the width of the feed opening; rotatable means coaxial with the auger conveyors and between the inner terminal ends thereof for intercepting axially moving material conveyed by the auger conveyors and including radially projecting, material-engaging elements for moving such material rearwardly to the feed opening; and a pair of oppositely wound extension augers, one cooperative with and effective as an extension of each auger conveyor, selectively mountable on or dismountable from the rotatable means for selectively increasing or decreasing the axial inward extents of the auger conveyors, said extension augers when mounted intersecting the material-engaging elements to decrease the material-engaging capacity of said elements.

9. The invention defined in claim 8, further characterized in that: each extension auger comprises a plurality of separable arcuate sections connectible in end-to-end series relationship and selectively usable together or separately to vary the axial inward extent of the proximate auger conveyor in single or multiple increments according to the lengths of said sections.

ALVIN W. OEHLER.

REFERENCES CITED

The following references are of record in the file of this patent:

UNITED STATES PATENTS

| Number | Name | Date |
| --- | --- | --- |
| 234,868 | Hawkins | Nov. 30, 1880 |
| 2,172,982 | Mitchell | Sept. 12, 1939 |
| 2,360,776 | Kozak | Oct. 17, 1944 |
| 2,477,970 | Downing | Aug. 2, 1949 |
| 2,478,009 | Pool | Aug. 2, 1949 |
| 2,529,180 | Oehler | Nov. 7, 1950 |